(12) United States Patent
Chen

(10) Patent No.: US 8,888,420 B2
(45) Date of Patent: *Nov. 18, 2014

(54) TOOL CHUCKING APPARATUS

(75) Inventor: Peter Chen, Taoyuan County (TW)

(73) Assignee: Primetool Mfg, Inc., Taoyuan County (TW)

( * ) Notice: Subject to any disclaimer, the term of this patent is extended or adjusted under 35 U.S.C. 154(b) by 1233 days.

This patent is subject to a terminal disclaimer.

(21) Appl. No.: 12/505,201

(22) Filed: Jul. 17, 2009

(65) Prior Publication Data

US 2009/0278324 A1  Nov. 12, 2009

Related U.S. Application Data

(63) Continuation-in-part of application No. 11/724,205, filed on Mar. 15, 2007, now abandoned.

(51) Int. Cl.
*B23B 31/20* (2006.01)

(52) U.S. Cl.
CPC .................................. *B23B 31/201* (2013.01)
USPC ................................ 409/234; 279/42; 279/48

(58) Field of Classification Search
USPC ............ 409/232, 234; 279/42, 48, 52, 56, 51, 279/49; 408/238, 239 R, 239 A, 240
See application file for complete search history.

(56) References Cited

U.S. PATENT DOCUMENTS

| | | | |
|---|---|---|---|
| 1,372,482 A * | 3/1921 | Clare | 279/48 |
| 1,509,061 A * | 9/1924 | Hardwicke | 279/60 |
| 1,953,637 A | 4/1934 | Smith et al. | |
| 1,973,942 A * | 9/1934 | Buhr | 279/49 |
| 2,578,642 A * | 12/1951 | Dodge | 279/49 |
| 2,631,860 A * | 3/1953 | Bronson | 279/56 |
| 3,719,367 A | 3/1973 | Baturka | |
| 3,734,513 A | 5/1973 | Kanebako et al. | |
| 3,810,641 A | 5/1974 | Benjamin | |
| 3,894,743 A * | 7/1975 | Hiroumi | 279/47 |
| 4,844,070 A * | 7/1989 | Dee | 606/167 |
| 5,402,580 A | 4/1995 | Seto et al. | |
| 5,439,005 A * | 8/1995 | Vaughn | 600/568 |
| 6,923,451 B2 | 8/2005 | Taguchi et al. | |
| 2009/0322042 A1 * | 12/2009 | Kitamura | 279/49 |
| 2012/0119450 A1 * | 5/2012 | Komine | 279/52 |

FOREIGN PATENT DOCUMENTS

| | | |
|---|---|---|
| DE | 4012837 C1 | 7/1991 |
| DE | 29705890 U1 * | 11/1997 |
| DE | 20012246 U1 | 3/2001 |
| DE | 20201106 U1 | 5/2002 |
| JP | 58071009 A | 4/1983 |
| JP | 59024907 A * | 2/1984 |
| JP | 11099441 A * | 4/1999 |

(Continued)

*Primary Examiner* — Daniel Howell
(74) *Attorney, Agent, or Firm* — Chun-Ming Shih

(57) ABSTRACT

A tool chucking apparatus to hold a machining cutter or tool includes a holding member and a fastening member that are coupled together to form a grip space inside to hold a collet. The collet has a plurality of pawl structures with a plurality of elastic slots formed thereon. When the holding member and the fastening member are coupled, the collet has one end tightly held in the holding member and the other end tightly held in the fastening member. Hence the two ends of the collet contract the elastic slots to tightly grip the cutter or tool. As a result, machining precision improves, safety enhances and the life span of the cutter or tool increases.

4 Claims, 6 Drawing Sheets

(56) References Cited

FOREIGN PATENT DOCUMENTS

| | | | | |
|---|---|---|---|---|
| JP | 2000000705 | A | * | 1/2000 |
| JP | 2001113403 | A | * | 4/2001 |
| JP | 06023608 | A | | 2/2002 |
| JP | 2002059305 | A | | 2/2002 |

* cited by examiner

TOOL CHUCKING APPARATUS

This application is a continuation-in-part, and claims priority, of from U.S. patent application Ser. No. 11/724,205 now abandoned filed on Mar. 15, 2007, entitled "TOOL CHUCKING APPARATUS".

FIELD OF THE INVENTION

The present invention relates to a tool chucking apparatus and particularly to a chucking apparatus to firmly hold a tool.

BACKGROUND OF THE INVENTION

These days precision metal machining such as drilling, tapping, boring, milling, cutting of inner or outer diameters or surface grinding usually relies on CNC (Computer Numerical Control) machine tools in cooperation with a plurality of cutters or tools. Those cutters or tools mostly have an elongated stem connecting to a driving spindle of the CNC machine tools through a chucking apparatus or chucking structure. The driving spindle rotates in high speed to drive the cutters or tools held by the chucking apparatus to perform machining on a targeted object.

Hence the holding condition of the chucking apparatus on the cutters or tools directly affects the machining precision of the targeted object. If clamping is not tight enough during high speed rotation of the machining tool idle rotation of the cutters or tools occurs. Referring to FIG. 1, a conventional chucking apparatus mainly includes a fastening member 1, a collet 2 and a holding member 3. The holding member 3 is connected to a driving spindle (not shown in the drawing) of a machining tool, and has a housing space 4 to hold the collet 2 to form a tight coupling. The collet 2 is a hollow conical element and has a plurality of conical pawl structures 5 formed in an annular manner with a center passage 6. The pawl structures 5 are elastic. When a cutter or tool is inserted into the collet 2 the inner diameter of the center passage 6 can be adjusted accordingly. The fastening member 1 and the holding member 3 have respectively a corresponding screw thread 7 and 7' for screwing together to firmly hold the collet 2. In addition, as the collet 2 has the pawl structures 5, when the holding member 3 and the fastening member 1 are screwed together, the pawl structures 5 are forced and shrunk inwards to strengthen coupling of the cutter or tool to increase the firmness of machining and enhance the machining precision of the targeted object.

The collet 2 equipped with the pawl structures 5 to hold the cutter or tool has many advantages, such as it can hold cutters or tools of varying sizes and specifications. Moreover, when the holding member 3 and the fastening member 1 are screwed together, they automatically clamp the cutter or tool in an optimal condition. However, when the conical top of the collet 2 is moved towards the holding member 3 it mainly holds the distal end of the cutter or tool. Due to the targeted object to receive machining usually is a hard article such as metal, and the driving spindle (not shown in the drawing) of the machining tool rotates at high speeds, with the collet 2 holding the cutter or tool at the distal end, only the distal end receives the force, hence the cutter or tool is not being held and fastened securely. Loosening or slipping of the cutter could take place during machining process. Moreover, as the cutter or tool has an excessive portion exposed outside the collet 2, when a great force is applied or the forcing angle is not applied vertically, the cutter or tool could be skewed. As a result, machining precision suffers. It could even cause damage of the collet 2 or the machining tool and result in a great loss of cost.

U.S. Pat. No. 1,953,637 discloses a chuck which has a shell, a nut coupling with the shell and a stem running through the nut and movable relative to the nut. The stem has a plurality of springs to couple with a plurality of jaws. The jaws are held in the shell. The stem moves towards the shell to push the jaws through the springs so that the jaws butt the inner wall of the shell and the front end thereof can grip a cutter. However, when the jaws butt the inner wall of the shell, the rear end of the jaws (namely one end connecting to the spring) is merely braced by the elasticity of the spring. The rear end of the jaws cannot firmly grip the cutter, and the cutter is not firmly held. When the cutter performs machining to a work piece, cutter wobbling could occur due to infirm holding. This could cause poor precision of machining and produce rough edges on the work piece. The cutter could even be thrown out during high speed operation. Not only the cutter or work piece could be damaged, it also creates a serious concern on user's safety.

SUMMARY OF THE INVENTION

The primary object of the present invention is to provide a tool chucking apparatus to enhance holding firmness of a cutter or tool on a machining tool during machining for a targeted metal to prevent suffering of precision or damage of the machining cutter or tool, and also reduce rough edges and facilitate machining of tough machining material. To achieve the foregoing object the tool chucking apparatus of the invention includes a holding member and a fastening member. The holding member has one end coupled with the fastening member to form a grip space inside. The holding member has a first contact surface in the grip space, and the fastening member has a second contact surface. The grip space tightly holds a collet inside. The collet and holding member and fastening member are coupled tightly together to form a holding passage, and hold the cutter or tool through the collet. The collet has a plurality of pawl structures which are spaced in an annular manner and formed in a conical structure with a plurality of elastic slots. The pawl structures are elastic and can adjust the inner diameter according to the cutter or tool. The pawl structures have a third contact surface and a fourth contact surface. When the pawl structures are coupled with the holding member and fastening member, the third contact surface is tightly in contact with the first contact surface, and the fourth contact surface is tightly in contact with the second contact surface, so that the collet and holding member and fastening member form a compact coupling to firmly grip the cutter or tool. Thereby the cutter or tool can be firmly gripped and prevented from loosening during machining process. Moreover, the conical structure has a top end facing the fastening member to allow the cutter or tool to be inserted deeply into the chucking apparatus without exposing too much outside the chucking apparatus. As a result, the cutter or tool can be held firmer to improve machining precision on the targeted metal. Safety and the life span of the cutter are enhanced. In addition, the fastening member and the holding member have respectively a coupling structure corresponding to each other. The fastening member further has an encasing portion extended towards the holding member. The holding member and the encasing portion have respectively a fifth contact surface and a sixth contact surface corresponding to and tightly in contact with each other to increase concentricity of the holding member and the fastening member to further improve steadiness of the chucking apparatus during operation of the machining tool.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
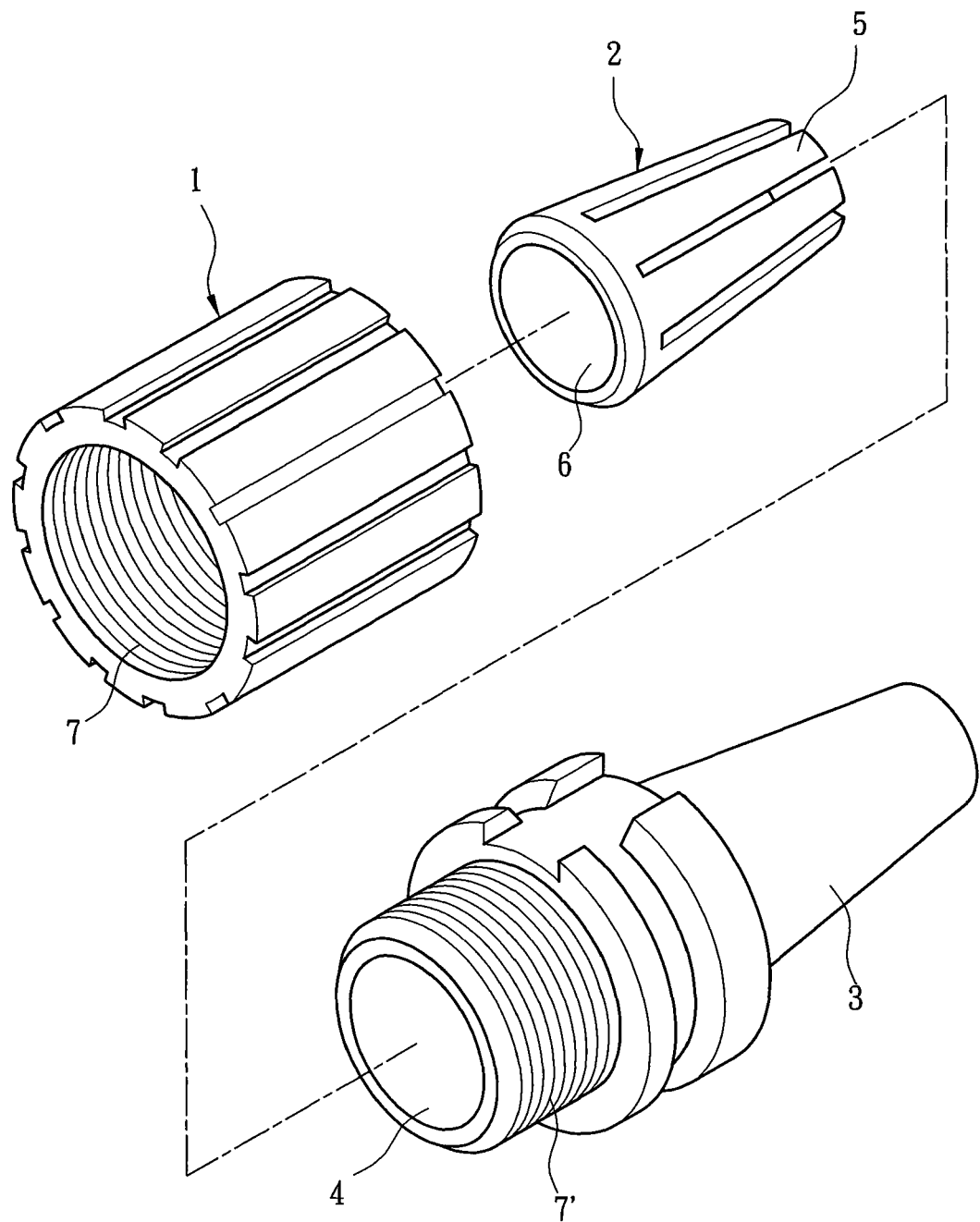
FIG. 1 is an exploded view of a conventional tool chucking apparatus.
Figure 2:
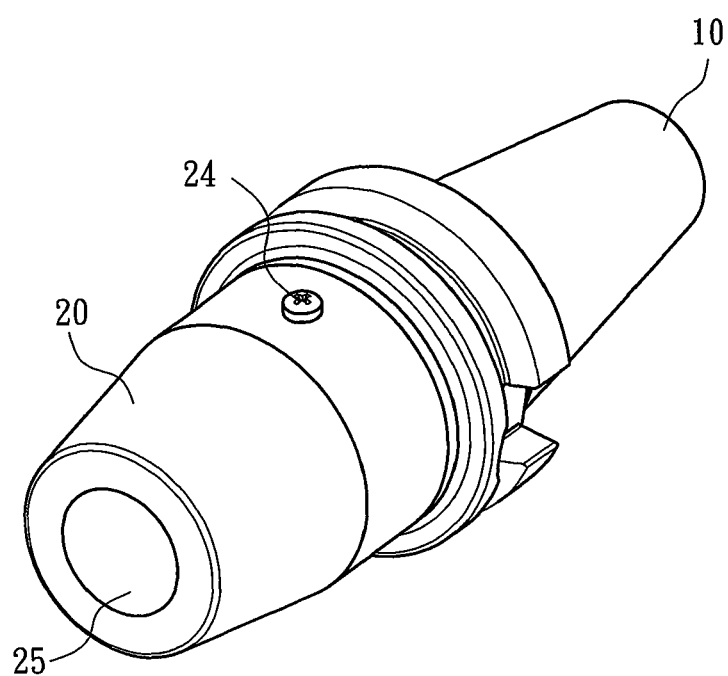
FIG. 2 is a perspective view of the tool chucking apparatus of the invention.
Figure 3:
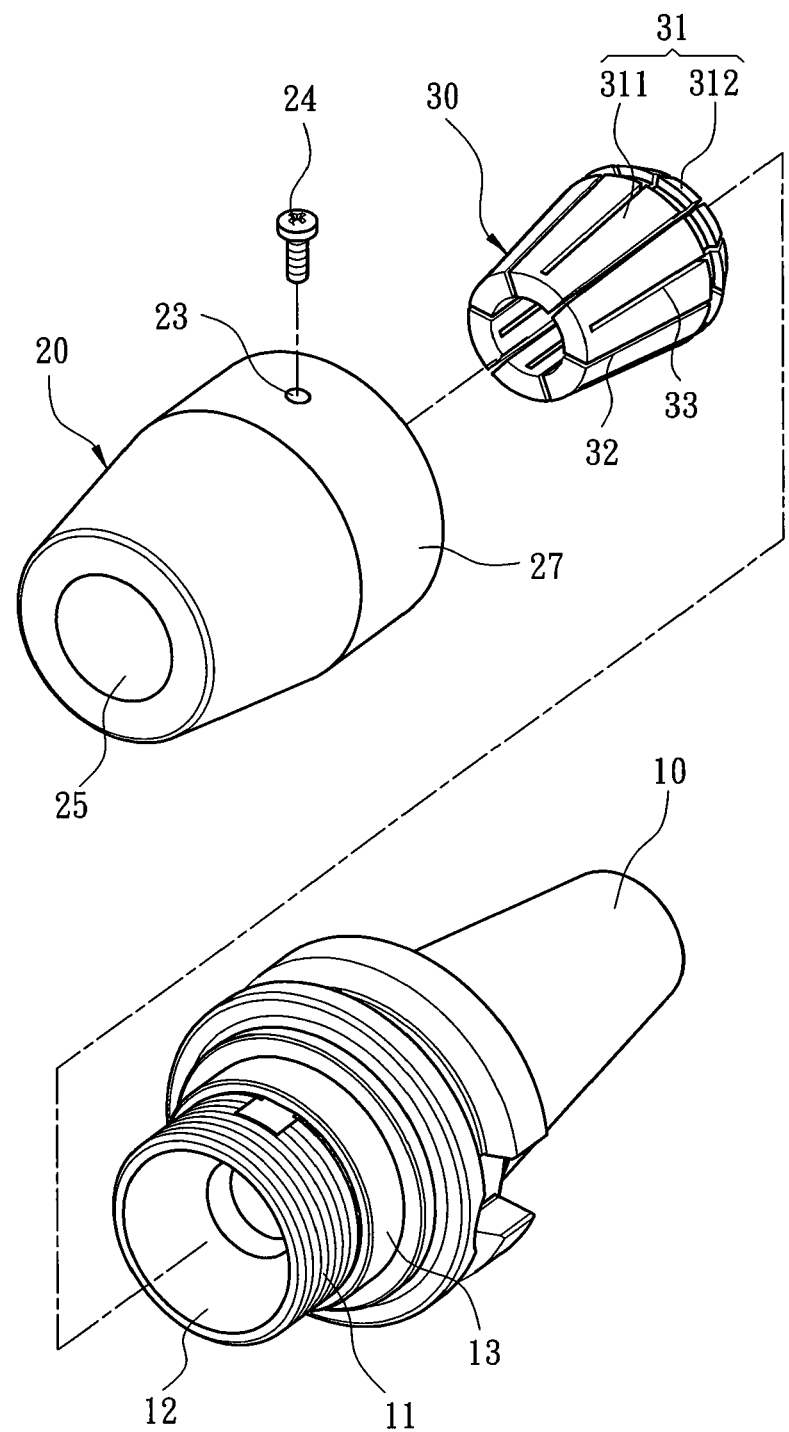
FIG. 3 is an exploded view of the tool chucking apparatus of the invention.
Figure 4:
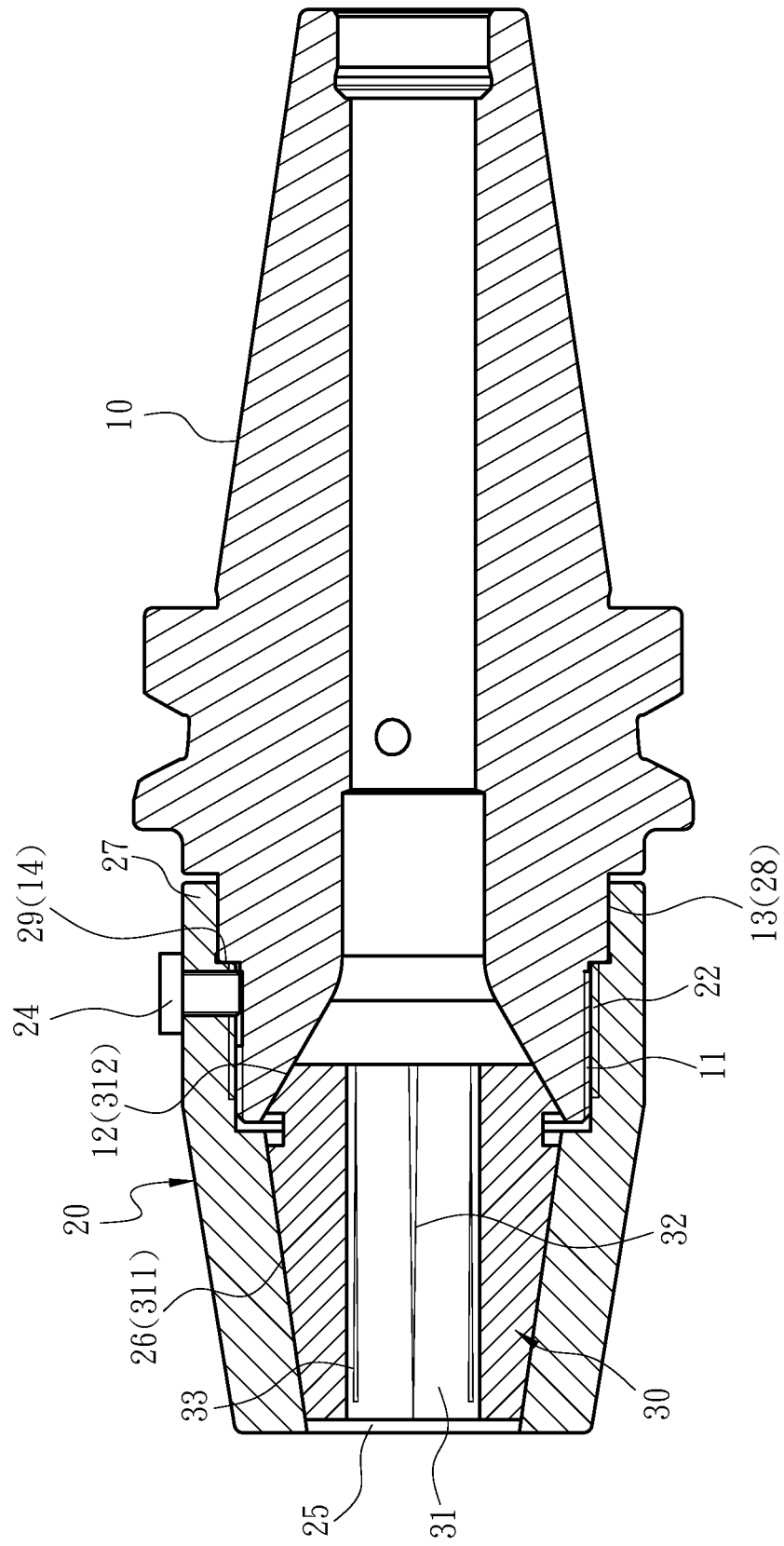
FIG. 4 is a sectional view of the tool chucking apparatus of the invention.

Please refer to FIGS. 2, 3 and 4, the tool chucking apparatus according to the invention aims to couple a machining tool (not shown in the drawings) with a machining cutter or tool (also not shown in the drawings), and to be connected to a driving spindle (not shown in the drawings) of the machining tool so that the machining tool can drive the cutter or tool held by the tool chucking apparatus to rotate at high speed to do machining on a targeted object (not shown in the drawings). The tool chucking apparatus of the invention includes a holding member 10 and a fastening member 20 coupling with the holding member 10 to form a grip space 25 inside to hold a collet 30 tightly. The holding member 10 has one end connecting to the driving spindle and another end forming a first screw thread 11. The fastening member 20 has a second screw thread 22 corresponding to the first screw thread 11 that can engage with each other to form a tight fastening between the fastening member 20 and the holding member 10 (in an embodiment of the invention coupling of the fastening member 20 and the holding member 10 is accomplished through the screw threads, but it is not the main feature of the invention). The holding member 10 has a first contact surface 12 in the grip space 25, and the fastening member 20 has a second contact surface 26. The first contact surface 12 and the second contact surface 26 respectively form a grip angle in the grip space 25. To prevent the holding member 10 and fastening member 20 from loosening during the high speed rotation at least one through threaded passage 23 may be formed at the coupling juncture thereof to receive at least one corresponding bolt 24. Hence after the holding member 10, fastening member 20 and collet 30 are coupled together, a passage is formed in the center to receive a machining cutter or tool.

The collet 30 is the main holding structure of the cutter or tool. It has a plurality of pawl structures 31 arranged in a conical structure. The pawl structures 31 have a third contact surface 312 at one end corresponding to the first contact surface 12 and a fourth contact surface 311 at the other end corresponding to the second contact surface 26. Furthermore, the pawl structures 31 are formed in an annular manner with a plurality of elastic slots 32 and 33 formed thereon and spaced from one another so that the pawl structures 31 can provide the collet 30 with desired elasticity. When the cutter or tool of varying specifications is inserted, the pawl structures 31 can adjust the inner diameter thereof. The elastic slots 33 correspond to the third contact surface 312 and have openings facing the direction of the third contact surface 312. The other elastic slots 32 correspond to the fourth contact surface 311 and have other openings facing the direction of the fourth contact surface 311.

Figure 5A:
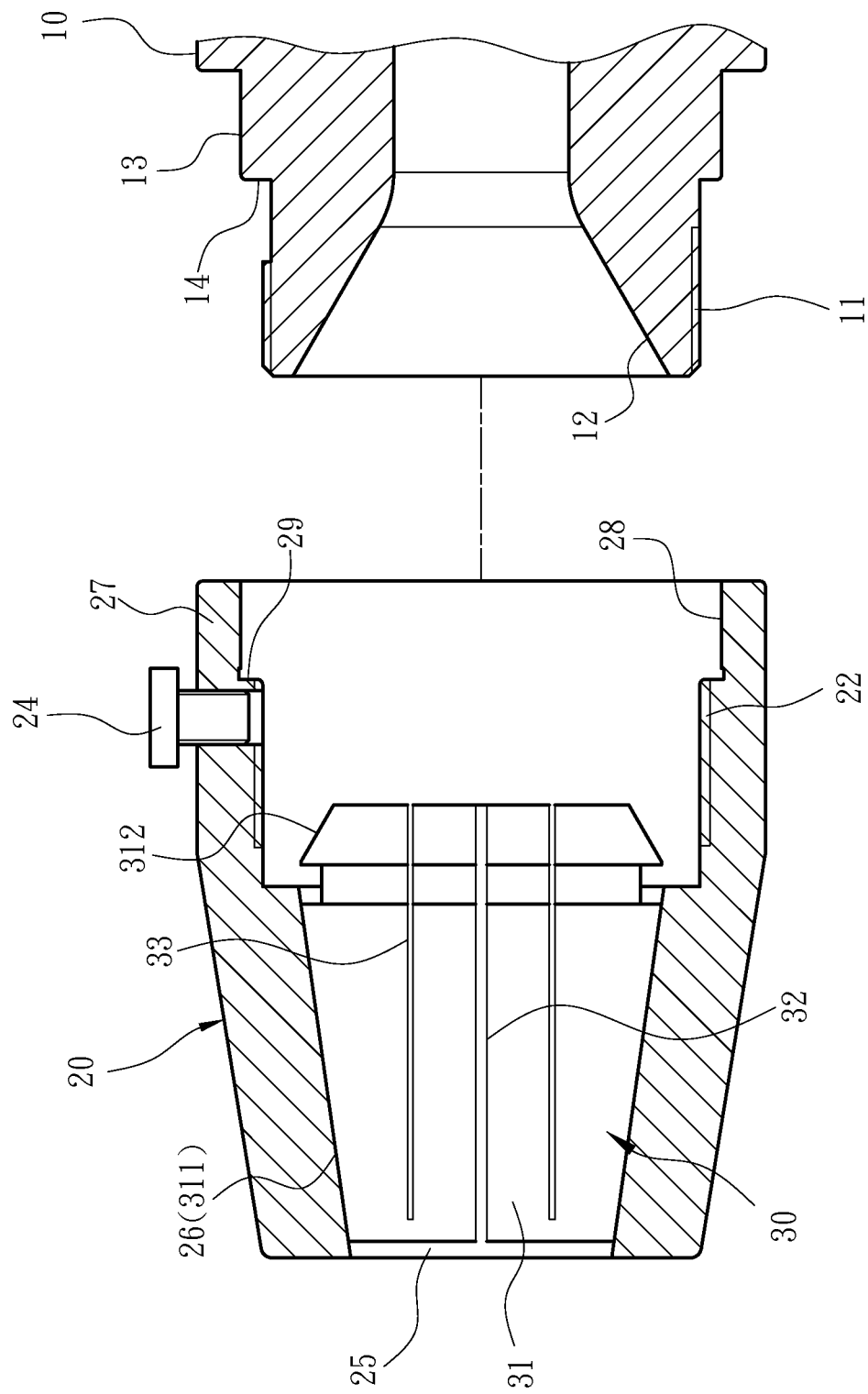
FIGS. 5A and 5B are schematic views of the tool chucking apparatus of the invention in coupled conditions.
Figure 5B:
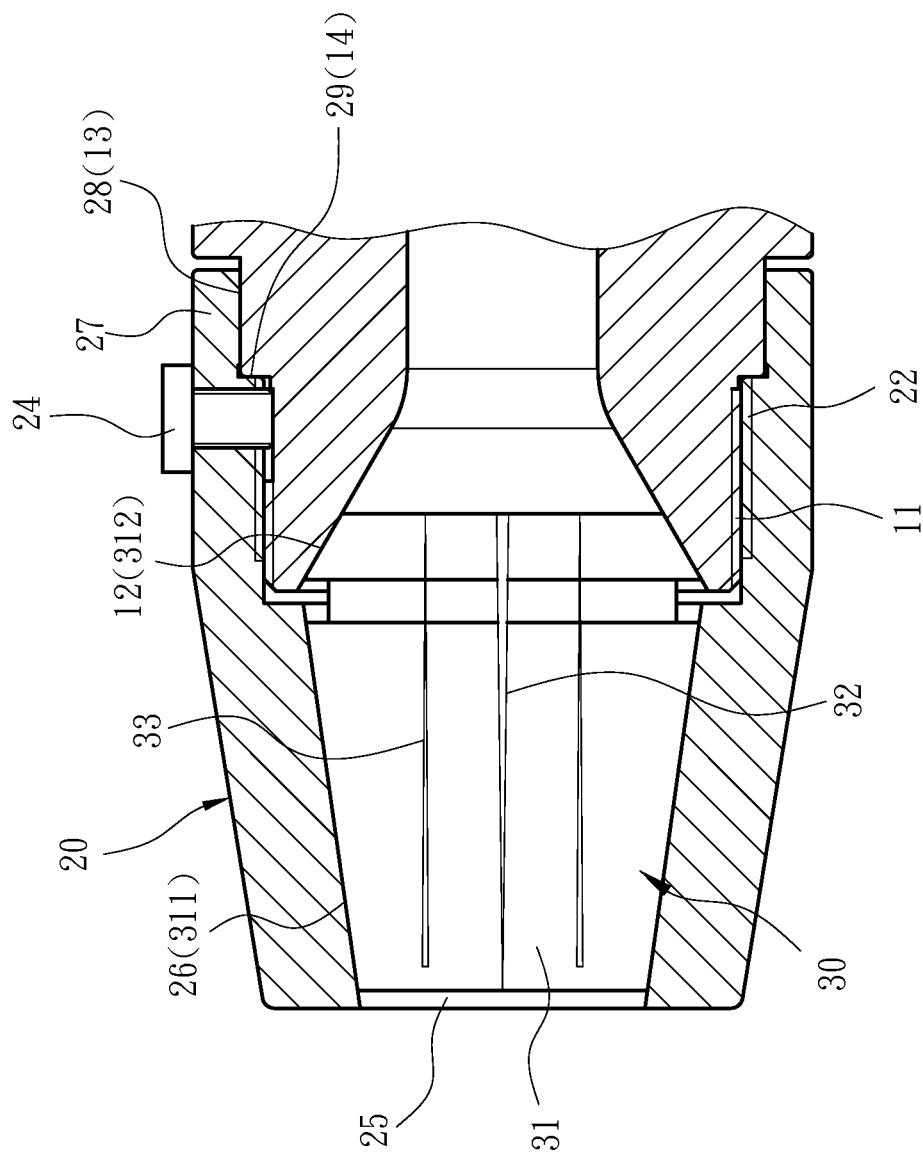

Also referring to FIGS. 5A and 5B, for assembly, first dispose the collet 30 in the grip space 25; couple the holding member 10 and the fastening member 20 by screwing the first and second screw threads 11 and 22 so that the first contact surface 12 butts the third contact surface 312, and the second contact surface 26 butts the fourth contact surface 311; with the first and second screw threads 11 and 22 screwing deeper, the grip angles of the first and second contact surfaces 12 and 26 push the collet 30 moving towards the second contact surface 26, and the elastic slots 32 and 33 are squeezed to shrink, hence two ends of the pawl structures 31 contract inwards and the third contact surface 312 and the first contact surface 12 form a closed contact, and the fourth contact surface 311 and the second contact surface 26 also form a closed contact, as a result, the collet 30 and the holding member 10 and fastening member 20 form a compact coupling to tightly grip the cutter. The collet 30 has two ends providing double grip forces for the cutter. Therefore, the cutter is less likely loosening off during high speed machining operation. This not only can improve machining precision and eliminate rough edges of the work piece, also can prevent the cutter from being thrown out and enhance safety and the life span of the cutter. Moreover, differs from the conventional structure that has the top end of the conical structure of the collet 30 facing the holding member 10 or driving spindle, the conical structure of the collet 30 of the invention has the top end facing the fastening member 20. Thereby the machining cutter or tool can be held deeper in the tool chucking apparatus without exposing too much outside. Such a design increases the contact area of the cutter or tool and the tool chucking apparatus, and reduces the impact of external forces. Thus machining precision of the cutter or tool on the targeted object improves significantly.

In addition, the fastening member 20 has an encasing portion 27 extended towards the holding member 10 to encase one end of the holding member 10. The encasing portion aims to increase the coupling firmness of the holding member 10 and the bottom end of the collet 30. Moreover, the holding member 10 and the encasing portion 27 have respectively a fifth contact surface 13 and a sixth contact surface 28 corresponding to each other to form a closed contact, thereby to enhance concentricity of coupling of the holding member 10 and the fastening member 20. This also enhances machining steadiness and precision.

As previously discussed, after the holding member 10 and the fastening member 20 are coupled together, the third contact surface 312 of the collet 30 and the first contact surface 12 of the holding member 10 form a closed contact, and the fourth contact surface 311 of the collet 30 and the second contact surface 26 of the fastening member 20 form a closed contact, so that the collet 30 and the holding member 10 and the fastening member 20 form a compact coupling to tightly grip the cutter. As a result, machining precision and safety improve, and the life span of the cutter also increases.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A tool chucking apparatus for holding a machining cutter or tool, comprising:

a holding member and a fastening member that have corresponding coupling structures to form the chucking apparatus, the holding member and the fastening member being coupled to form a grip space, the holding member having a first contact surface in the grip space, the fastening member having a second contact surface, the first contact surface and the second contact surface having respectively a grip angle, wherein the fastening member has an encasing portion, the holding member and the encasing portion having respectively a fifth contact surface and a sixth contract surface corresponding to and forming a closed contact with each other, and wherein the first contact surface has an edge formed on top of the holding member, and the second contact surface has an edge formed in the grip space and corresponds to the edge of the first contact surface; and a collet which is held tightly in the grip space and has a plurality of pawl structures, the pawl structures having a plurality of elastic slots spaced from each other and a third contact surface at one end corresponding to the first contact surface and a fourth contact surface at the other end corresponding to the second contact surface, wherein an annular slot is formed between the third contact surface and the fourth contact surface, and two corresponding edges of the first contact surface and the second contact surface are located directly radially outward of the annular slot, such that the two corresponding edges are within an axial extent of the annular slot;

wherein when the holding member and the fastening member are coupled, the third contact surface butts the first contact surface and the fourth contact surface butts the second contact surface, and the collet is moved to shrink the elastic slots so that the first contact surface and the third contact surface are contacted closely and the second contact surface and the fourth contact surface are contacted closely such that the collet and the holding member and the fastening member form a compact coupling and two ends of the collet tightly grip the cutter or tool held in the tool chucking apparatus.

2. The tool chucking apparatus of claim 1, wherein the elastic slots include slots corresponding to the third contact surface and having openings facing the third contact surface, and other slots corresponding to the fourth contact surface and having other openings facing the fourth contact surface.

3. The tool chucking apparatus of claim 1, wherein the coupling structures of the fastening member and the holding member are corresponding screw threads to screw the fastening member and the holding member together.

4. The tool chucking apparatus of claim 1, wherein the fastening member and the holding member form a coupling juncture which has at least one through threaded passage to engage with at least one corresponding bolt.

\* \* \* \* \*